Figure 1:
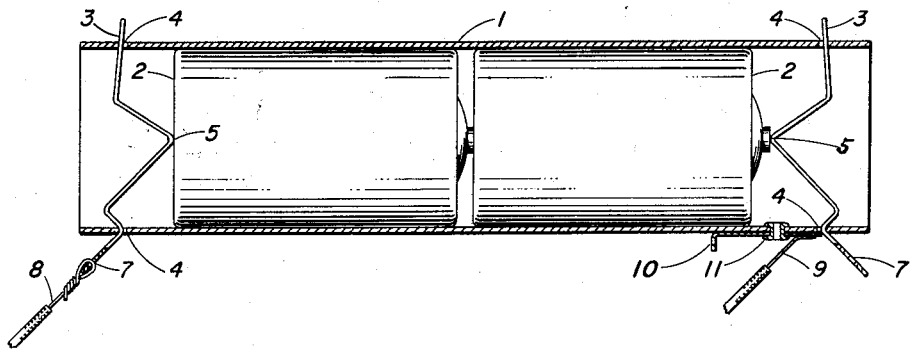

Sept. 20, 1955  R. J. SPOONER  2,718,541
BATTERY HOLDERS
Filed Nov. 30, 1953

INVENTOR.
ROBERT J. SPOONER.
BY
Joseph K. Schofield
attorney

United States Patent Office 2,718,541
Patented Sept. 20, 1955

2,718,541

BATTERY HOLDERS

Robert J. Spooner, Essex, Conn.

Application November 30, 1953, Serial No. 395,132

4 Claims. (Cl. 136—173)

This invention relates to a holder for batteries and more particularly to a holder in the form of a sleeve for operatively connecting two or more dry cell batteries of the flashlight type.

A primary object of the invention is to provide a simple inexpensive holder comprising a tube or sleeve of insulating material such as paper, plastic or other non-metallic material, leads being connected to transverse metal strips contacting the opposite end faces of the group of cells, the transverse strips also forming retaining means for the batteries or cells within the sleeve.

A feature of importance of the invention is that the transverse metal strips are sufficiently resilient to firmly press against the end faces of the batteries to form a good electrical contact; also the strips are adapted to adjust themselves to variable lengths of the batteries and prevent their removal from the tube.

Another object of the invention that is important is that a switch may be mounted on the outside of the sleeve and positioned for movement into and out of contact with one of the transverse metal strips to close a circuit including the batteries.

With the above and other objects in view, the invention may include the features of construction and operation set forth in the following specification and illustrated in the accompanying drawing.

In the accompanying drawing annexed hereto and forming a part of this specification, I have shown the invention embodied in a sleeve type holder for but two batteries but it will be understood that the invention can be otherwise embodied and that the drawing is not to be construed as defining or limiting the scope of the invention, the claims appended to this specification being relied upon for that purpose.

Figure 2:
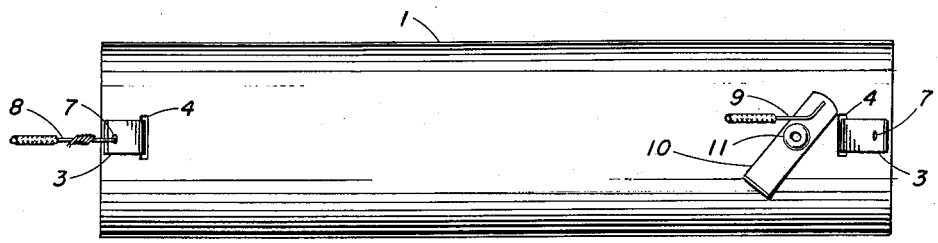

In the drawing:

Fig. 1 is a longitudinal central sectional view of a holder made in accordance with the present invention, and Fig. 2 is an outside view of the holder shown in Fig. 1.

In the above-mentioned drawing, there has been shown but one embodiment of the invention which is now deemed preferable, but it will be understood that changes and modifications may be made within the scope of the appended claims without departing from the spirit of the invention.

Referring more in detail to the figures of the drawing, there is shown at 1 a length of paper or other non-metallic and non-conducting tubing. Adjacent the ends of this tubing are transverse narrow elongated slots 4, the slots at each end being disposed diametrically opposite each other. Extending between opposite portions of the tubing wall and passing through the pairs of slots 4 are sheet metal strips 3. These strips 3 are of sufficient resilience to support the weight of the batteries 2 housed within the tube, and prevent their displacement. The strips 3 are bent as shown so that they will contact as at one of their bends 5 and firmly press against an end surface of a battery 2. At one end of one of the strips 3 a lead wire 8 may be attached directly as by soldering after passing the lead through a small hole 7 in the strip.

On the outer surface of the tube 1 is an eyelet 11 forming a pivot about which a metal strip 10 may swing. In one position the strip 10 contacts the surface of one of the transversely extending strips 3 to close a circuit between the lead 8, the batteries 2 and a lead 9 attached to the strip 10 forming the switch.

The batteries 2, two of which are shown enclosed within the tube 1, have their end surfaces in contact with the angularly bent central portion 5 of the transverse strips 3. The flexibility of the strips 3 permits them to accommodate slight variations in the length of the batteries. Also at one end the strip 3 bears directly against the central or positive pole of the battery. At the opposite end of the tube 1 the strip 3 bears against the end closing surface of the battery shell.

I claim as my invention:

1. A battery holder comprising a tube of nonconducting material, batteries therein, transversely extending resilient metal strips passing through the tube adjacent the ends thereof and contacting the opposite ends of said batteries, and leads connected to said strips.

2. A battery holder comprising a tube of nonconducting material, transversely extending metal strips adjacent the opposite ends of the tube and adapted to resiliently bear against the end faces of batteries within said tube, a switch member mounted on said tube and movable to contact one of said strips, and leads connected to one of said strips and to said switch member.

3. A holder for batteries comprising a tube of nonconducting material, having slots provided therein adjacent the ends of said tube, transversely extending metal strips passing through said slots, a lead connected to one of said strips, a switch member pivotally mounted on said tube and movable into engagement with the other of said strips, and a lead attached to said switch member.

4. A holder for batteries comprising a tube of nonconducting material, having slots provided therein adjacent the ends of said tube, transversely extending metal strips passing through said slots, said strips being shaped to resiliently contact the central end surfaces of said batteries, and leads therefor, one lead attached to one of said strips and the other lead connectible to the opposite strip.

References Cited in the file of this patent

UNITED STATES PATENTS 2,303,988     Christiansen _____ Dec. 1, 1942

FOREIGN PATENTS 534,177     Great Britain _____ Feb. 28, 1941